(12) United States Patent
Futakuchi et al.

(10) Patent No.: US 10,337,636 B2
(45) Date of Patent: Jul. 2, 2019

(54) DISPLACEMENT CONTROL VALVE

(71) Applicant: EAGLE INDUSTRY CO., LTD., Minato-ku, Tokyo (JP)

(72) Inventors: Masayuki Futakuchi, Tokyo (JP); Kohei Fukudome, Tokyo (JP); Masahiro Hayama, Tokyo (JP); Hideki Higashidozono, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 99 days.

(21) Appl. No.: 15/527,686

(22) PCT Filed: Nov. 18, 2015

(86) PCT No.: PCT/JP2015/082328
§ 371 (c)(1),
(2) Date: May 17, 2017

(87) PCT Pub. No.: WO2016/084663
PCT Pub. Date: Jun. 2, 2016

(65) Prior Publication Data
US 2018/0187793 A1 Jul. 5, 2018

(30) Foreign Application Priority Data
Nov. 25, 2014 (JP) .................. 2014-237324

(51) Int. Cl.
*F16K 31/02* (2006.01)
*F16K 31/06* (2006.01)
(Continued)

(52) U.S. Cl.
CPC .......... *F16K 31/0613* (2013.01); *F04B 39/08* (2013.01); *F16J 15/10* (2013.01);
(Continued)

(58) Field of Classification Search
CPC .. F16K 31/061; F16K 31/0624; F16K 27/029; F16K 27/048; F16J 15/10
See application file for complete search history.

(56) References Cited

U.S. PATENT DOCUMENTS 3,267,614 A * 8/1966 Cazalis ................ B25J 21/02
220/378
5,326,079 A * 7/1994 Ferrando .............. F16K 27/029
251/359

(Continued)

FOREIGN PATENT DOCUMENTS

JP 2003527973 A 9/2003
JP 2009281408 A 12/2009
(Continued)

OTHER PUBLICATIONS

International Search Report (ISR) dated Feb. 9, 2016, issued for International application No. PCT/JP2015/082328.

*Primary Examiner* — Umashankar Venkatesan
(74) *Attorney, Agent, or Firm* — Law Office of Katsuhiro Arai

(57) ABSTRACT

The inflow of an external fluid into a mounting hole of a displacement control valve can be prevented, and accumulated gas in the mounting hole due to the permeation leakage of high-pressure gas can be discharged to the outside. A displacement control valve 1 inserted and fitted in a mounting hole 3 provided in a casing of a device controlled in displacement includes a sealing lip 46. The sealing lip 46 is fitted in a fitting section 41 at an outer peripheral portion of the displacement control valve 1 on a side close to an entrance of the mounting hole 3. The sealing lip 46 has a lip portion 46b abutting on an inner peripheral surface of the mounting hole 3.

10 Claims, 5 Drawing Sheets

(51) Int. Cl.
   *F16J 15/10*     (2006.01)
   *F16K 27/02*     (2006.01)
   *F16K 27/04*     (2006.01)
   *F04B 39/08*     (2006.01)
   *F16K 11/07*     (2006.01)
   *B60H 1/00*      (2006.01)
   *F16K 17/196*    (2006.01)

(52) U.S. Cl.
   CPC ......... *F16J 15/102* (2013.01); *F16K 11/0716* (2013.01); *F16K 27/029* (2013.01); *F16K 27/041* (2013.01); *F16K 27/048* (2013.01); *F16K 31/061* (2013.01); *F16K 31/0624* (2013.01); *B60H 1/00485* (2013.01); *F16K 17/196* (2013.01); *F16K 31/0668* (2013.01)

(56) References Cited

U.S. PATENT DOCUMENTS

| | | | | |
|---|---|---|---|---|
| 6,206,038 | B1 * | 3/2001 | Klein | B60T 8/5025 137/596.17 |
| 6,231,029 | B1 * | 5/2001 | Park | B60T 8/363 138/44 |
| 6,345,870 | B1 * | 2/2002 | Linkner, Jr. | B60T 8/367 251/129.02 |
| 7,413,099 | B2 * | 8/2008 | Takahashi | B65D 53/02 206/710 |
| 2003/0101561 | A1 | 6/2003 | Kefalas et al. | |
| 2004/0178378 | A1 * | 9/2004 | Collins | B60T 8/363 251/129.15 |
| 2008/0164434 | A1 | 7/2008 | Iwa et al. | |
| 2011/0018211 | A1 | 1/2011 | Tsuji | |
| 2012/0326065 | A1 * | 12/2012 | Ferguson | B60T 8/363 251/129.15 |
| 2013/0291963 | A1 | 11/2013 | Futakuchi et al. | |
| 2017/0298812 | A1 * | 10/2017 | Lenk | F02B 37/16 |

FOREIGN PATENT DOCUMENTS

| | | | |
|---|---|---|---|
| JP | 2010196794 | A | 9/2010 |
| JP | 2012107673 | A | 6/2012 |
| JP | 2014149035 | A | 8/2014 |
| WO | 2006009095 | A1 | 1/2006 |
| WO | WO2008097534 | * | 8/2008 |
| WO | 2009113417 | A1 | 9/2009 |
| WO | 2012077439 | A1 | 6/2012 |

* cited by examiner

DISPLACEMENT CONTROL VALVE

This application is the U.S. National Phase under 35 U.S.C. § 371 of International Application PCT/JP2015/082328, filed Nov. 18, 2015, which claims priority to Japanese Patent Application No. 2014-237324, filed Nov. 25, 2014. The International Application was published under PCT Article 21(2) in a language other than English.

TECHNICAL FIELD

The present invention relates to displacement control valves for variably controlling the flow rate or pressure of working fluids, and for example, relates to displacement control valves for controlling the discharge rate of variable displacement compressors or the like used in air-conditioning systems in automobiles or the like, according to pressure loads.

BACKGROUND ART

For example, as shown in FIG. 5, a displacement control valve 50 for controlling the discharge rate of a variable displacement compressor according to pressure loads includes a valve housing 51 formed with a metal material or a resin material, a valve element 52 disposed reciprocably in the valve housing 51, a pressure-sensitive element 53 biasing the valve element 52 in one direction, a solenoid 54 connected to the valve housing 51, for exerting an electromagnetic driving force on the valve element 52, and others.

The solenoid 54 includes a casing 55 coupled to the valve housing 51, an end member 56 provided in such a manner as to seal an upper opening of the casing 55, a sleeve 57 closed at one end, a cylindrical fixed iron core 58 disposed inside of the casing 55 and the sleeve 57, a driving rod 59 coupled to the valve element 52 at its distal end reciprocably in the inside of the fixed iron core 58, a movable iron core 60 fixed to the other end of the driving rod 59, a coil spring 61 biasing the movable iron core 60, an exciting coil 62 wound on the outside of the sleeve 57 via a bobbin, and others. The casing 55 and the end member 56 are integrally joined together by caulking an upper end of the casing 55. An O-ring 78 is provided between them to seal the interior of the solenoid 54.

The valve housing 51 includes a first valve chest 65 formed in the middle of a discharge-side passage, a second valve chest 66 formed in the middle of a suction-side passage, a third valve chest 67 formed close to a control chamber (not shown) of the variable displacement compressor, and others.

Ps represents suction pressure, Pd discharge pressure, and Pc control chamber pressure.

The displacement control valve 50 like this is inserted into a mounting hole 71 formed in a casing 70 of the variable displacement compressor, and is fixed by attaching a C-ring 74 to an opening end of the mounting hole 71. In that state, ports 65a, 66a, and 67a of the first valve chest 65, the second valve chest 66, and the third valve chest 67 communicate with refrigerant passages in the casing 70. To seal the ports 65a, 66a, and 67a, a first O-ring 68 and a second O-ring 69 are fitted in recessed portions of the valve housing 51, and a third O-ring 72 is fitted in a recessed portion of the casing 55. A fourth O-ring 73 is provided at a joint between the casing 55 and the end member 56 and on the outer periphery of an upper end portion of the casing 55. Contact between the O-ring 73 and an inner peripheral surface of the mounting hole 71 prevents the inflow of water, mud, and the like from the outside (see an arrow 75), which is a known invention (Hereinafter, it is referred to as "Conventional Art 1". See Patent Document 1, for example.).

There is also a known invention in which, in place of the fourth O-ring 73 in Conventional Art 1, an elastically deformable lip-shaped sealing member is provided by integral molding to the outer peripheral side of the end member 56 in such a manner as to face the opening end of the mounting hole 71 (Hereinafter, it is referred to as "Conventional Art 2". See Patent Document 2, for example.).

CITATION LIST

Patent Document

Patent Document 1: JP 2009-281408 A
Patent Document 2: JP 2010-196794 A

SUMMARY OF THE INVENTION

Problem to be Solved by the Invention

However, in above Conventional Art 1, when the displacement control valve 50 is used under high pressure for $CO_2$, for example, occurrence of permeation leakage shown by an arrow 76 can result in occurrence of accumulation of high-pressure gas in a space 77 between the third O-ring 72 and the fourth O-ring 73. Occurrence of accumulation of high-pressure gas causes a problem that since the diameter of the fourth O-ring 73 is larger than the diameter of the third O-ring 72, during removal of the displacement control valve 50, the displacement control valve 50 bursts out to the outside, leading to an accident.

In above Conventional Art 2, the provision of the sealing member to the end member 56 by integral molding results in limitations on the parted shape of a mold to produce the end member 56, causing a problem that the shape of the end member 56 is limited.

The present invention has been made to solve the problems of the above conventional arts, and has an object of providing a displacement control valve including a sealing means that can prevent the inflow of a fluid containing water, dust, mud, or the like from the outside (hereinafter, sometimes referred to as an "external fluid") into a mounting hole of the displacement control valve, and discharge gas accumulated in the mounting hole due to the permeation leakage of high-pressure gas (hereinafter, sometimes referred to as an "internal fluid") to the outside, and is easy to produce and mount.

Means for Solving Problem

To attain the above object, a displacement control valve according to a first aspect of the present invention is a displacement control valve inserted and fitted in a mounting hole provided in a casing of a device controlled in displacement, the displacement control valve including a sealing lip fitted in a fitting section at an outer peripheral portion of the displacement control valve on a side close to an entrance of the mounting hole, the sealing lip having a lip portion abutting on an inner peripheral surface of the mounting hole.

According to this aspect, the inflow of an external fluid into the mounting hole of the displacement control valve can be prevented, and accumulated gas in the mounting hole (an internal fluid) due to the permeation leakage of high-pressure gas can be discharged to the outside, which can eliminate the problem that during removal of the displacement control valve, the displacement control valve bursts out to the outside, leading to an accident. In addition, the sealing means is easy to produce and mount. Further, since the sealing lip is a member independent of the main body of the displacement control valve, the degree of freedom in the shape of the main body of the displacement control valve is increased, compared to the case where it is integrally formed with the main body of the displacement control valve.

According to a second aspect of the present invention, in the displacement control valve according to the first aspect, the fitting section is provided at a joint between a casing and an end member constituting parts of the displacement control valve.

According to this aspect, the sealing lip can be mounted using the joint between the casing and the end member, which eliminates the need to add processing on a special member for mounting the sealing lip.

According to a third aspect of the present invention, in the displacement control valve according to the first or second aspect, the sealing lip has a substantially L shape in cross section.

According to this aspect, since one piece of the L-shaped sealing lip can be fixed by fitting to use the other piece as a lip, it can be mounted compactly along the outer periphery of the cylindrical shape of the displacement control valve. In particular, when the one piece of the sealing lip is fitted and mounted between the casing and the end member, it can be mounted more compactly.

According to a fourth aspect of the present invention, in the displacement control valve according to any one of the first to third aspects, the lip portion is provided in a direction orthogonal to the inner peripheral surface of the mounting hole.

According to this aspect, the sealing lip can be mounted without making the structure of the fitting section special.

According to a fifth aspect of the present invention, in the displacement control valve according to any one of the first to third aspects, the lip portion is provided at an angle such that a distal end thereof points toward the outside of the mounting hole, and a gap is provided between an inclined-side surface of the lip portion and the outer peripheral portion.

According to this aspect, under the pressure of an external fluid, the sliding pressure of the lip portion increases, and conversely, under the pressure of an internal fluid, the sliding pressure of the lip portion decreases, and at the same time, the lip portion becomes easier to deform, thus being able to securely prevent the inflow of the external fluid and being able to facilitate the discharge of the internal fluid.

According to a sixth aspect of the present invention, in the displacement control valve according to the fifth aspect, the lip portion is provided with a protrusion on the surface on the side inclined toward the outside, and the protrusion abuts on the outer peripheral portion.

According to this aspect, a pressing force can be added to the lip portion due to the abutting of the protrusion on the outer peripheral portion, thus being able to prevent dust, mud, and the like contained in the external fluid from entering inward of the lip portion to accumulate.

According to a seventh aspect of the present invention, in the displacement control valve according to any one of the first to sixth aspects, the sealing lip is formed from a rubber material.

According to this aspect, the sealing lip can provide secure sealing. In particular, when the sealing lip is pinched between the casing and the end member, and the casing is caulked to be integrated with the end member, the sealing lip can also serve as a cushioning member to prevent damage to the end member due to too much caulking.

Effect of the Invention

The present invention achieves outstanding effects as below.

(1) The inflow of an external fluid into the mounting hole of the displacement control valve can be prevented, and accumulated gas in the mounting hole (an internal fluid) due to the permeation leakage of high-pressure gas can be discharged to the outside, which can eliminate the problem that during removal of the displacement control valve, the displacement control valve bursts out to the outside, leading to an accident. In addition, the sealing means is easy to produce and mount. Further, since the sealing lip is a member independent of the main body of the displacement control valve, the degree of freedom in the shape of the main body of the displacement control valve is increased, compared to the case where it is integrally formed with the main body of the displacement control valve.

(2) The fitting section is provided at the joint between the casing and the end member constituting parts of the displacement control valve, whereby the sealing lip can be mounted using the joint between the casing and the end member, which eliminates the need to add processing on a special member for mounting the sealing lip.

(3) Since the sealing lip has a substantially L shape in cross section, one piece of the L-shaped sealing lip can be fixed by fitting to use the other piece as a lip, and thus it can be mounted compactly along the outer periphery of the cylindrical shape of the displacement control valve. In particular, when the one piece of the sealing lip is fitted and mounted between the casing and the end member, it can be mounted more compactly.

(4) The lip portion is provided in a direction orthogonal to the inner peripheral surface of the mounting hole, whereby the sealing lip can be mounted without making the structure of the fitting section special.

(5) The lip portion is provided at an angle such that a distal end thereof points toward the outside of the mounting hole, and a gap is provided between the inclined-side surface of the lip portion and the outer peripheral portion, whereby under the pressure of an external fluid, the sliding pressure of the lip portion increases, and conversely, under the pressure of an internal fluid, the sliding pressure of the lip portion decreases, and at the same time, the lip portion becomes easier to deform, thus being able to securely prevent the inflow of the external fluid and being able to facilitate the discharge of the internal fluid.

(6) The lip portion is provided with a protrusion on the surface on the side inclined toward the outside, and the protrusion abuts on the outer peripheral portion, whereby a pressing force can be added to the lip portion due to the abutting of the protrusion on the outer peripheral portion, thus being able to prevent dust, mud, and the like contained in the external fluid from entering inward of the lip portion to accumulate.

(7) The sealing lip is formed from a rubber material, whereby the sealing lip can provide secure sealing, and in particular, when the sealing lip is pinched between the casing and the end member, and the casing is caulked to be integrated with the end member, the sealing lip can also serve as a cushioning member to prevent damage to the end member due to too much caulking.

DESCRIPTION OF EMBODIMENTS

Hereinafter, with reference to the drawings, forms for implementing this invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
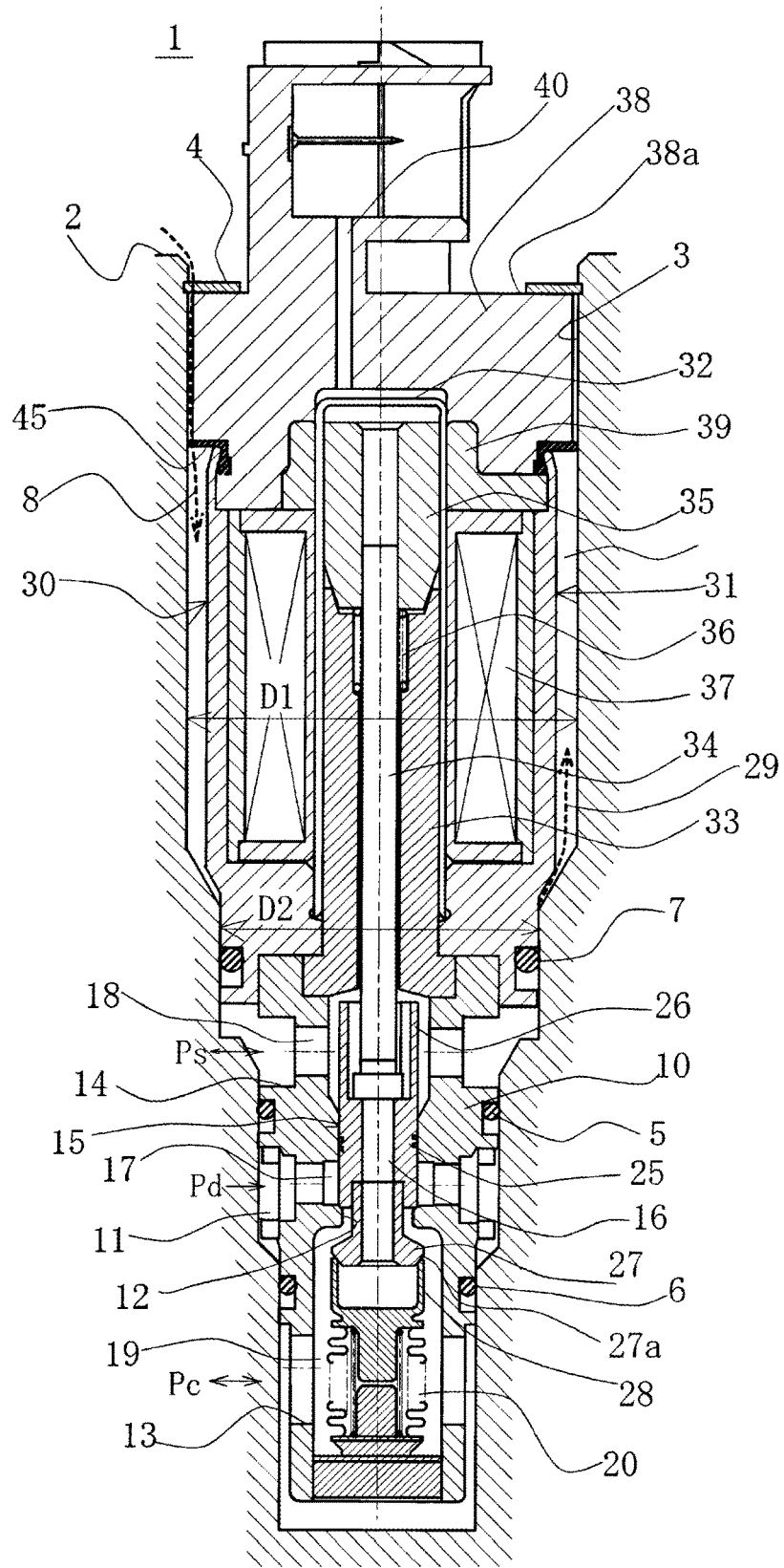
FIG. 1 is a cross-sectional view showing a displacement control valve according to a first embodiment of the present invention.
Figure 2:
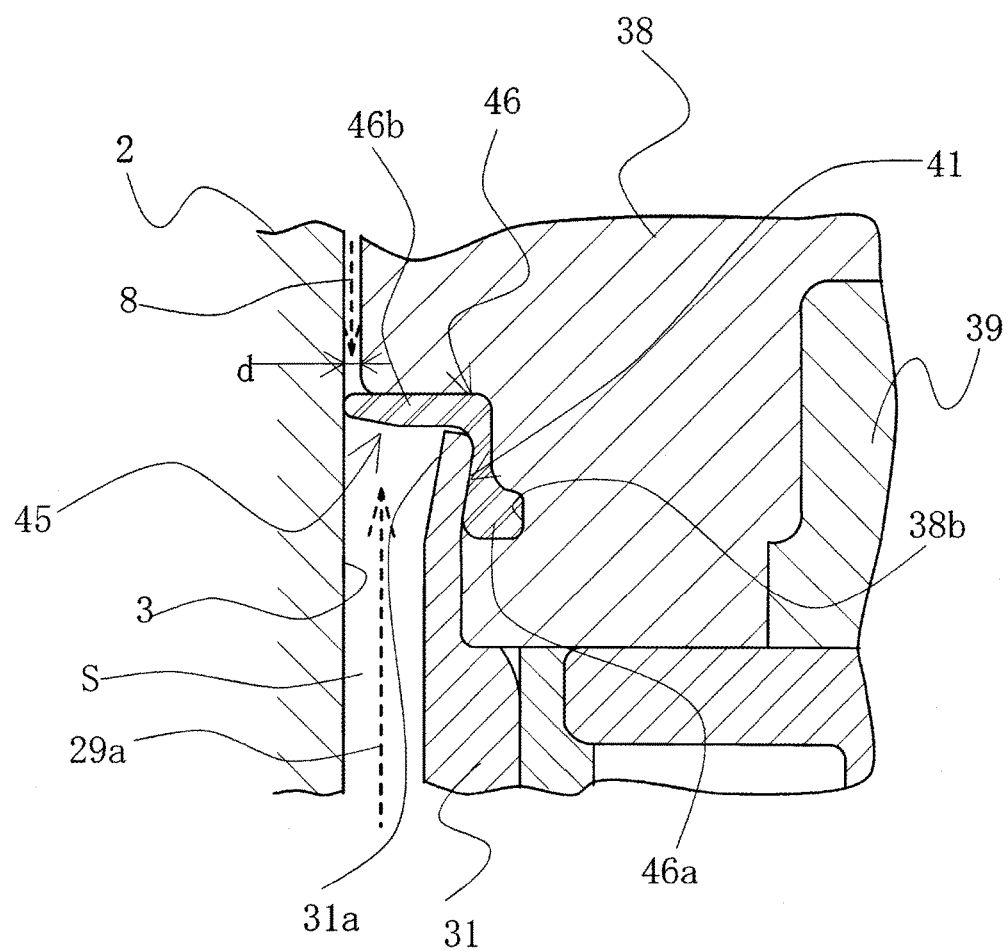
FIG. 2 is a diagram illustrating a sealing means according to the first embodiment of the present invention.

With reference to FIGS. 1 and 2, a displacement control valve according to a first embodiment of the present invention will be described.

A displacement control valve 1 includes a valve housing 10 formed with a metal material or a resin material, a valve element 15 disposed reciprocably in the valve housing 10, a pressure-sensitive element 20 biasing the valve element 15 in one direction, a solenoid 30 connected to the valve housing 10, for exerting an electromagnetic driving force on the valve element 15, and others.

The solenoid 30 includes a casing 31 formed with a metal material coupled to the valve housing 10, a sleeve 32 closed at one end, a cylindrical fixed iron core 33 disposed inside of the casing 31 and the sleeve 32, a driving rod 34 reciprocable in the inside of the fixed iron core 33 and coupled to the valve element 15 at its distal end to form a communicating path 16, a movable iron core 35 fixed to the other end of the driving rod 34, a coil spring 36 biasing the movable iron core 35 in a direction to open the valve element 15, an exciting coil 37 wound on the outside of the sleeve 32 via a bobbin, an end member 38 provided in such a manner as to seal an upper end opening of the casing 31, and others.

The valve housing 10 includes ports 11, 12, and 13 serving as a discharge-side passage, ports 13 and 14 serving as a suction-side passage together with the communicating path 16 in the valve element 15, a first valve chest 17 formed in the middle of the discharge-side passage, a second valve chest 18 formed in the middle of the suction-side passage, a third valve chest 19 formed in the discharge-side passage and the suction-side passage, and others.

Symbol Ps represents suction pressure of a variable displacement compressor controlled, Pd discharge pressure, and Pc control chamber pressure.

The valve element 15 is formed in a substantially cylindrical shape and includes a first valve section 25 on one side, a second valve section 26 on the other side, a third valve section 27 coupled opposite to the second valve section 26 across the first valve section 25 by retrofitting, the communicating path 16 extending therethrough from the second valve section 26 to the third valve section 27 in the axial direction to serve as the suction-side passage, and others.

The third valve section 27 has a shape expanded from a contracted state from the first valve chest 17 to the third valve chest 19, and is formed with a tapered engaging face 27a facing an adapter 28 at an expanded portion.

The pressure-sensitive element 20 is disposed in the third valve chest 19, and operates to exert a biasing force in a direction to open the first valve section 25 by its extension (expansion) and to weaken the biasing force exerted on the first valve section 25 by contracting with surrounding pressure increase.

A disc-shaped collar 39 and the end member 38 are fixed to the upper end opening of the casing 31 by caulking its upper end portion inward. The sleeve 32 is fitted in the center of the collar 39. A connection terminal 40 extends out from the exciting coil 37 wound on the outside of the sleeve 32 via the bobbin, passes through the collar 39, and is drawn out to a space in the end member 38.

The end member 38 is attached to seal all components contained in the casing 31 from above. The end member 38 is made of a resin molding material, molded with the connection terminal 40 to be connected to an external power supply, and formed in a substantially cylindrical shape.

A sealing means 45 for keeping the inside and the outside of the solenoid 30 airtight and preventing the entry of an external fluid is provided between the upper end portion of the casing 31 and a lower end outer peripheral portion of the end member 38.

The sealing means 45 will be described in detail below.

The displacement control valve 1 configured as described above is inserted into a mounting hole 3 formed in a casing 2 of the variable displacement compressor, with the valve housing 10 in front, and is fixed by engaging a C-ring 4 attached to an opening end of the mounting hole 3 with a step 38a of the end member 38. In that state, the ports 11, 14, and 13 of the first valve chest 17, the second valve chest 18, and the third valve chest 19 communicate with refrigerant passages in the casing 2. To demarcate and seal the ports 11, 14, and 13, a first O-ring 5 and a second O-ring 6 are fitted in recessed portions of the valve housing 10, and a third O-ring 7 is fitted in a recessed portion of the casing 31.

The displacement control valve 1 is set to be thinner on the valve housing 10 side and thicker on the end member side to have the relationship, the valve housing 10 outside diameter<the outside diameter of the casing 31<the outside diameter of the end member 38. The mounting hole 3 is increased in diameter on the entrance side and reduced in diameter stepwise toward the bottom side to substantially conform to the shape of the displacement control valve 1, to facilitate the insertion of the displacement control valve 1 into the mounting hole 3 with the valve housing 10 side in front. The diameter D1 of the mounting hole 3 at a portion where the sealing means 45 is provided is larger than the diameter D2 at a portion where the third O-ring 7 is provided.

On the other hand, when the displacement control valve is used under high pressure for $CO_2$, for example, permeation leakage shown by an arrow 29 occurs, resulting in the accumulation of high-pressure gas in a space S between the third O-ring 7 and the sealing means 45. A force caused by an accumulated internal fluid acts more greatly on a portion of the sealing means 45 since the sealing means 45 has a larger pressure-receiving area than the third O-ring 7.

Next, with reference to FIG. 2, the sealing means 45 will be described.

The sealing means 45 has a role of preventing the inflow of an external fluid 8 containing water, dust, mud or the like from the outside into the mounting hole 3, and discharging an internal fluid 29a accumulated in the space S due to permeation leakage 29 through the third O-ring 7 to the outside, and is provided on the side close to an entrance of the mounting hole 3.

Figure 5:
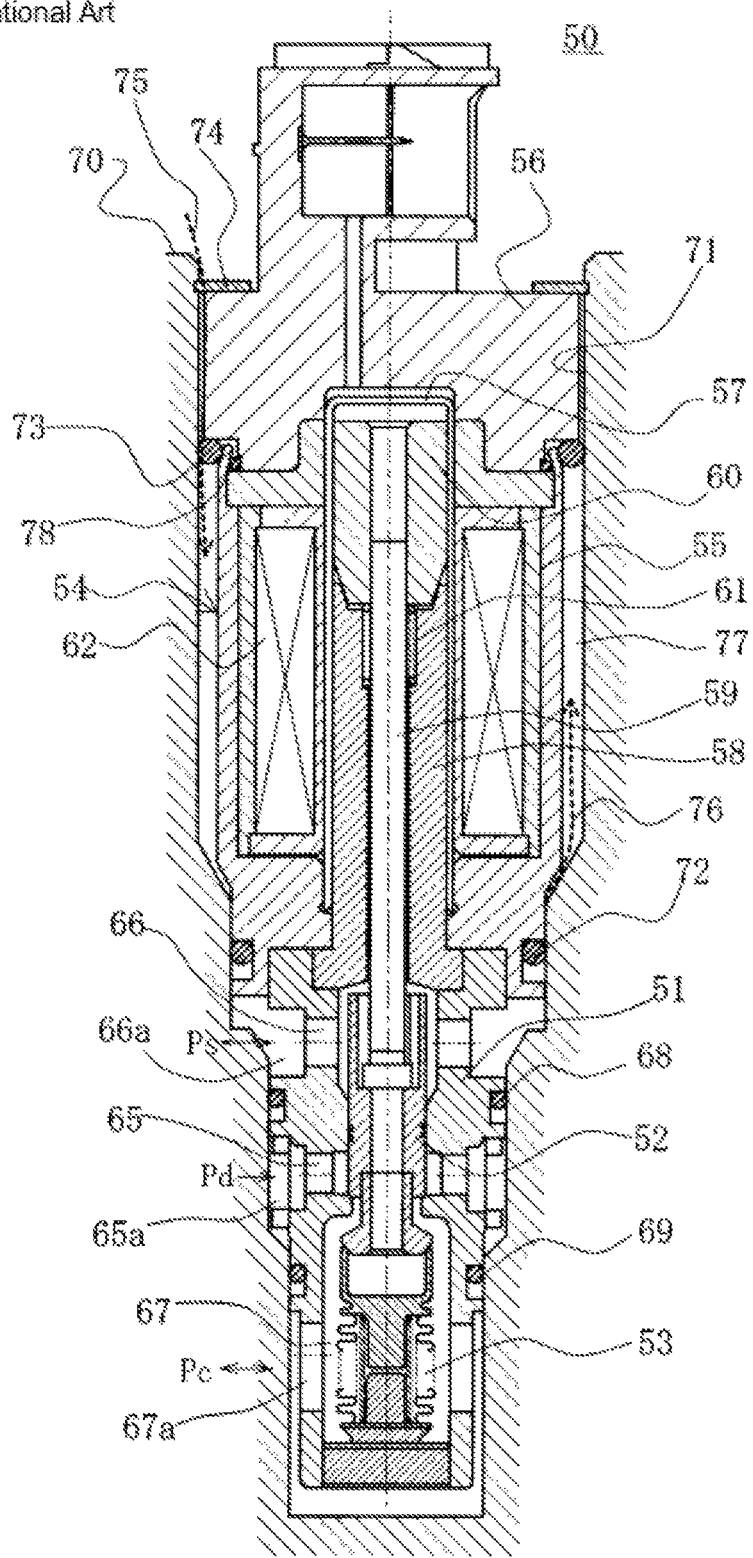
FIG. 5 is a cross-sectional view showing a displacement control valve of a conventional art.

In FIG. 2, the sealing means 45 is fitted in a fitting section 41 provided at a joint between the casing 31 and the end member 38 located on the side close to the entrance of the mounting hole 3, to prevent the inflow of an external fluid into the mounting hole 3. When the fitting section 41 is provided at the joint between the casing 31 and the end member 38, the sealing means 45 can also serve the function of an O-ring (see 78 in FIG. 5, for example) conventionally provided to seal the interior of the solenoid 30, which is advantageous.

The sealing means 45 has a sealing lip 46. The sealing lip 46 has a substantially L shape in cross section. A proximal portion 46a of the sealing lip 46 is fitted in a recessed portion 38b formed in the end member 38, and is pinched between the recessed portion 38b of the end member 38 and an upper end 31a of the casing 31 by caulking the upper end 31a of the casing 31 inward. The proximal portion 46a of the sealing lip 46 can seal the interior of the solenoid 30.

A lip portion 46b of the sealing lip 46 is provided in a direction orthogonal to an inner peripheral surface of the mounting hole 3 to abut on the inner peripheral surface with a moderate pressing force. The lip portion 46b is intended to prevent the inflow of an external fluid into the mounting hole 3.

The sealing lip 46 is preferably formed from a rubber material.

In FIG. 2, since the outside diameter of the end member 38 is larger than the outside diameter of the casing 31, a step is formed at the fitting section 41. An external surface of the lip portion 46b of the sealing lip (an upper surface in FIG. 2) abuts and is supported on the step, and an internal surface (a lower surface in FIG. 2) is supported to be able to contact and separate from an end portion of the upper end 31a of the casing 31.

The present embodiment has an advantage that the sealing lip 46 can be fitted at the joint between the casing 31 and the end member 38 without adding special processing. On the other hand, since a region in which the lip portion 46b can deform under the pressure of the internal fluid 29a accumulated in the space S is a gap d between the outer surface of the end member 38 and the inner surface of the mounting hole 3, which is small. Thus it is necessary to make the distal end of the lip portion 46b easily deformable.

The displacement control valve 1 in the first embodiment has the configuration as described above, and achieves prominent effects as below.

(1) The inflow of an external fluid into the mounting hole 3 of the displacement control valve 1 can be prevented, and accumulated gas in the mounting hole (an internal fluid) due to the permeation leakage of high-pressure gas can be discharged to the outside, which can eliminate the problem that during removal of the displacement control valve 1, the displacement control valve 1 bursts out to the outside, leading to an accident.

(2) The sealing means 45 is easy to produce and mount.

(3) Since the sealing lip 46 is a member independent of the main body of the displacement control valve 1, the degree of freedom in the shape of the main body of the displacement control valve 1 is increased, compared to the case where it is integrally formed with the main body of the displacement control valve 1.

(4) The sealing lip 46 can be fitted at the joint between the casing 31 and the end member 38 without adding special processing.

(5) The sealing lip 46 is formed from a rubber material, thereby being able to seal securely. In particular, when the sealing lip 46 is pinched between the casing 31 and the end member 38, and the casing 31 is caulked to be integrated with the end member 38, the sealing lip 46 can also serve as a cushioning member to prevent damage to the end member 38 due to too much caulking.

Second Embodiment

Figure 3:
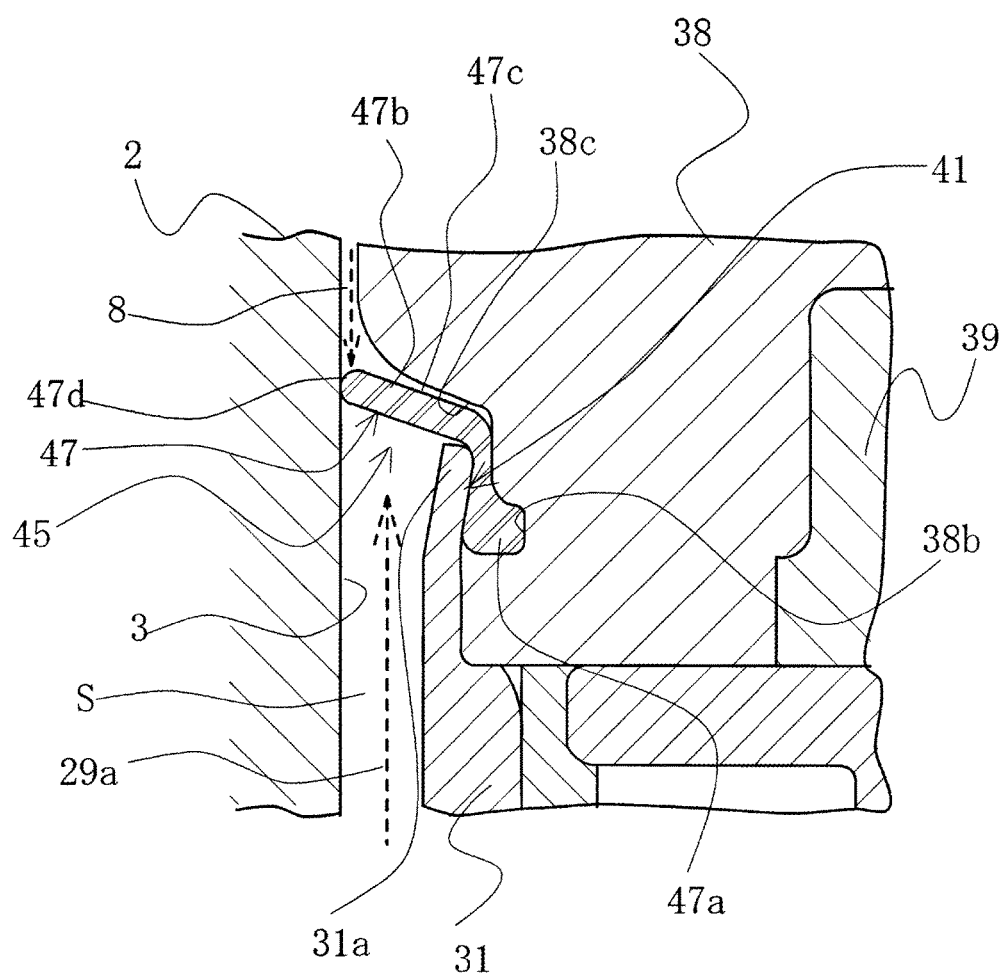
FIG. 3 is a diagram illustrating a sealing means according to a second embodiment of the present invention.

With reference to FIG. 3, a second embodiment of the present invention will be described.

The second embodiment is different from the first embodiment in that a sealing lip has a different shape, but otherwise basically the same as the first embodiment. The same members as in the first embodiment are denoted by the same symbols, and redundant descriptions will be omitted.

In FIG. 3, a proximal portion 47a of a sealing lip 47 is fitted in a recessed portion 38b formed in an end member 38, and is pinched between the recessed portion 38b of the end member 38 and an upper end 31a of a casing 31 by caulking the upper end 31a of the casing 31 inward.

A lip portion 47b of the sealing lip 47 is provided at an angle such that its distal end points toward the outside of a mounting hole 3. A gap is provided between an inclined-side surface 47c of the lip portion 47b and an outer peripheral portion 38c of the end member 38. That is, the lip portion 47b of the sealing lip 47 is inclined toward the outside of the mounting hole 3. Thus, the outer peripheral portion 38c of the end member 38 is formed at an angle such that the outside-diameter side points toward the outside of the mounting hole 3.

Since the lip portion 47b is provided at an angle such that its distal end points toward the outside of the mounting hole 3, when the lip portion 47b of the sealing lip 47 receives the pressure of an external fluid 8, the contact pressure of a slide-contact portion 47d increases, and conversely, when it receives the pressure of an internal fluid 29a accumulated in a space S, the contact pressure of the slide-contact portion 47d decreases. Since a gap is provided between the inclined-side surface 47c of the lip portion 47b and the outer peripheral portion 38c of the end member 38, the lip portion 47b receives the pressure of the external fluid 8 on almost the entire surface, and can easily deform in a direction to increase the contact pressure, and conversely, under the pressure of the internal fluid 29, the lip portion 47b can easily deform in a direction to reduce the contact pressure.

As above, the structure resists the entry of the external fluid 8 and facilitates the discharge of the internal fluid 29.

The displacement control valve 1 in the second embodiment has the configuration as described above, and achieves prominent effects as below.

(1) The inflow of an external fluid into the mounting hole 3 of the displacement control valve 1 can be prevented, and accumulated gas in the mounting hole (an internal fluid) due to the permeation leakage of high-pressure gas can be discharged to the outside, which can eliminate the problem that during removal of the displacement control valve 1, the displacement control valve 1 bursts out to the outside, leading to an accident.

(2) The sealing means 45 is easy to produce and mount.

(3) Since the sealing lip 47 is a member independent of the main body of the displacement control valve 1, the degree of freedom in the shape of the main body of the displacement control valve 1 is increased, compared to the case where it is integrally formed with the main body of the displacement control valve 1.

(4) It resists the entry of the external fluid 8 and facilitates the discharge of the internal fluid 29a.

Third Embodiment

Figure 4:
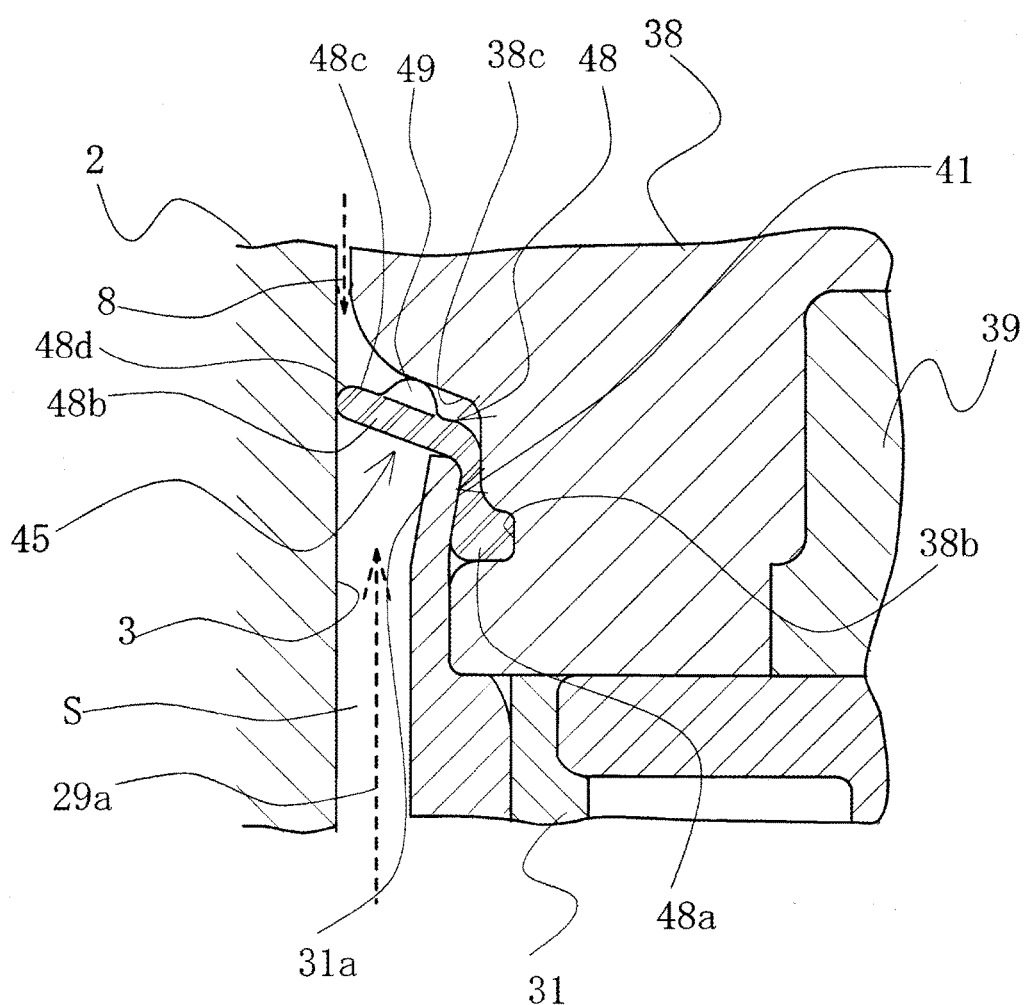
FIG. 4 is a diagram illustrating a sealing means according to a third embodiment of the present invention.

With reference to FIG. 4, a third embodiment of the present invention will be described.

The third embodiment is different from the second embodiment in that a sealing lip is provided with a protrusion, but otherwise basically the same as the second embodiment. The same members as in the second embodiment are denoted by the same symbols, and redundant descriptions will be omitted.

In FIG. 4, a proximal portion 48a of a sealing lip 48 is fitted in a recessed portion 38b formed in an end member 38, and is pinched between the recessed portion 38b of the end member 38 and an upper end 31a of a casing 31 by caulking the upper end 31a of the casing 31 inward.

A lip portion 48b of the sealing lip 48 is provided at an angle such that its distal end points toward the outside of a mounting hole 3. A protrusion 49 is provided on a surface 48c of the lip portion 48b on the side inclined toward the outside. The protrusion 49 abuts on an outer peripheral portion 38c of the end member 38.

Since the lip portion 48b is provided at an angle such that its distal end points toward the outside of the mounting hole 3, when the lip portion 48b of the sealing lip 48 receives the pressure of an external fluid 8, the contact pressure of a slide-contact portion 48d increases, and conversely, when it receives the pressure of an internal fluid 29a, the contact pressure of the slide-contact portion 48d decreases. Since the protrusion 49 is provided on the inclined-side surface 48c of the lip portion 48b, and the protrusion 49 abuts on the outer peripheral portion 38c of the end member 38, a pressing force can be added to the lip portion 48b due to the abutting of the protrusion 49 on the outer peripheral portion 38c, thus being able to prevent the external fluid 8 from entering inward of the lip portion 48b to accumulate.

The displacement control valve 1 in the third embodiment has the configuration as described above, and achieves prominent effects as below.

(1) The inflow of an external fluid into the mounting hole 3 of the displacement control valve 1 can be prevented, and accumulated gas in the mounting hole (an internal fluid) due to the permeation leakage of high-pressure gas can be discharged to the outside, which can eliminate the problem that during removal of the displacement control valve 1, the displacement control valve 1 bursts out to the outside, leading to an accident.

(2) The sealing means 45 is easy to produce and mount.

(3) Since the sealing lip 48 is a member independent of the main body of the displacement control valve 1, the degree of freedom in the shape of the main body of the displacement control valve 1 is increased, compared to the case where it is integrally formed with the main body of the displacement control valve 1.

(4) It resists the entry of the external fluid 8 and facilitates the discharge of the internal fluid 29a.

(5) It can prevent the external fluid 8 from entering inward of the lip portion 48b to accumulate.

Although the embodiments of the present invention have been described above with reference to the drawings, detailed configurations are not limited to the embodiments. Any changes and additions without departing from the scope of the present invention are included in the present invention.

For example, the above embodiments have been described with the case where the sealing means 45 is fitted in the fitting section 41 provided at the joint between the casing and the end member 38 as an example, which is advantageous but is not necessarily limiting. The sealing means 45 may be fitted in a portion close to the entrance of the mounting hole 3.

For example, the above embodiments have been described with the case where the sealing lip has a substantially L shape in cross section, which is not limiting. The sealing lip may have a U, V, Y, or J shape, for example.

For example, the above embodiments have been described with the case where the sealing lip is formed from a rubber material, which is not limiting. The sealing lip may be made of resin, for example.

REFERENCE SIGN LIST 1 displacement control valve
2 casing of variable displacement compressor
3 mounting hole
4 C-ring
5 first O-ring
6 second O-ring
7 third O-ring
8 external fluid
10 valve housing
11 port
12 port
13 port
14 port
15 valve element
16 communicating path
17 first valve chest
18 second valve chest
19 third valve chest
20 pressure-sensitive element
25 first valve section
26 second valve section
27 third valve section
28 adapter
29 permeation leakage
29a internal fluid due to permeation leakage
30 solenoid
31 casing
31a upper end
32 sleeve
33 fixed iron core
34 driving rod
35 movable iron core
36 coil spring
37 exciting coil
38 end member
38a step
38b recessed portion
39 collar
40 connection terminal
41 fitting section
45 sealing means
46, 47, 48 sealing lip
46a, 47a, 48a proximal portion
46b, 47b, 48b lip portion
49 protrusion
Pd discharge pressure
Ps suction pressure
Pc control chamber pressure

The invention claimed is:

1. A displacement control valve inserted and fitted in a mounting hole provided in a casing of a variable displacement compressor, wherein a direction in which the displacement control valve is inserted in the mounting hole is defined as a downward direction, and a direction opposite the downward direction is defined as an upward direction, the displacement control valve comprising:
   a device casing,
   an end member that is provided on an upper end portion of the device casing, wherein the end member is mounted at or close to an upper opening end of the mounting hole, and
   a sealing lip that is constituted by a proximal portion and a lip portion connected to each other, wherein:
      the proximal portion constitutes an inner side of the sealing lip and is fixedly clamped between and by the end member and the device casing, and
      the lip portion constitutes an outer side of the sealing lip and abuts on an inner peripheral surface of the mounting hole, wherein the lip portion is disposed between the end member and the device casing in a manner that a lower surface of the lip portion facing downward is freely touchable to and separable from the casing of the displacement control valve.

2. The displacement control valve according to claim 1, wherein the sealing lip has a substantially L shape in cross section.

3. The displacement control valve according to claim 2, wherein the lip portion is provided in a direction orthogonal to the inner peripheral surface of the mounting hole.

4. The displacement control valve according to claim 2, wherein the sealing lip is formed from a rubber material.

5. The displacement control valve according to claim 1, wherein the lip portion is provided in a direction orthogonal to the inner peripheral surface of the mounting hole.

6. The displacement control valve according to claim 1, wherein the sealing lip is formed from a rubber material.

7. A displacement control valve inserted and fitted in a mounting hole provided in a casing of a device controlled in displacement, the displacement control valve comprising:
   an end member that is provided on an upper end portion of the device casing, wherein the end member is mounted at or close to an upper opening end of the mounting hole,
   a sealing lip fitted in a fitting section at an outer peripheral portion of the displacement control valve on a side close to an opening end of the mounting hole, the sealing lip having a lip portion abutting on an inner peripheral surface of the mounting hole, wherein
   the lip portion is provided at an angle such that a distal end thereof points toward the outside of the mounting hole, and a gap is provided between an inclined-side surface of the lip portion and the outer peripheral portion of the end member.

8. The displacement control valve according to claim 7, wherein
   the lip portion is provided with a protrusion on the surface on the side inclined toward the outside, and
   the protrusion abuts on the outer peripheral portion.

9. A displacement control valve inserted and fitted in a mounting hole provided in a casing of a device controlled in displacement, the displacement control valve comprising:
   an end member that is provided on an upper end portion of the device casing, wherein the end member is mounted at or close to an upper opening end of the mounting hole,
   a sealing lip fitted in a fitting section at an outer peripheral portion of the displacement control valve on a side close to an opening end of the mounting hole, the sealing lip having a lip portion abutting on an inner peripheral surface of the mounting hole, wherein
   the sealing lip has a substantially L shape in cross section,
   the lip portion is provided at an angle such that a distal end thereof points toward the outside of the mounting hole, and a gap is provided between an inclined-side surface of the lip portion and the outer peripheral portion of the end member.

10. The displacement control valve according to claim 9, wherein
    the lip portion is provided with a protrusion on the surface on the side inclined toward the outside, and
    the protrusion abuts on the outer peripheral portion.

* * * * *